US005445588A

United States Patent [19]

Ishibashi et al.

[11] Patent Number: 5,445,588

[45] Date of Patent: Aug. 29, 1995

[54] PRINTING ROLLER

[75] Inventors: Nobuyuki Ishibashi, Nagareyama; Tsurumatsu Takano, Chiba; Yoshio Mori, Tokyo, all of Japan

[73] Assignee: Kinyosha Co., Ltd., Tokyo, Japan

[21] Appl. No.: 174,203

[22] Filed: Dec. 27, 1993

[51] Int. Cl.$^{6}$ .......... B23P 15/00

[52] U.S. Cl. .......... 492/31; 492/32

[58] Field of Search .......... 492/31, 32, 170; 507/170, 348

[56] References Cited

U.S. PATENT DOCUMENTS

| | | | |
|---|---|---|---|
| 2,393,529 | 1/1946 | Harrigan | 492/31 |
| 3,874,331 | 4/1975 | Kirsen | 118/227 |
| 4,155,766 | 5/1979 | Hieber et al. | 492/31 |
| 4,301,583 | 11/1981 | Poole | 29/121 |
| 4,819,558 | 4/1989 | Counard | 101/348 |
| 4,912,824 | 4/1990 | Baran | 492/31 |
| 5,099,759 | 3/1992 | Sonobe et al. | 101/348 |
| 5,113,760 | 5/1992 | Sonobe et al. | 101/348 |

FOREIGN PATENT DOCUMENTS

| | | |
|---|---|---|
| 0347456 | 12/1989 | European Pat. Off. . |
| 2449484 | 9/1980 | France . |
| 1110991 | 4/1989 | Japan . |
| 2066050 | 3/1990 | Japan . |

*Primary Examiner*—Irene Cuda
*Attorney, Agent, or Firm*—Hedman, Gibson & Costigan

[57] ABSTRACT

A printer rolling includes a surface layer roughened by forming a plurality of lattice-shaped grooves such that a large number of diamond-shaped configurations are defined by the grooves, each diamond-shaped configuration including two diagonally facing corners each having an angle of 20° to 160°, or by forming a number of parallel grooves each forming an angle of 10° to 80° with the axis of the metal core, so as to form a continuous groove.

2 Claims, 4 Drawing Sheets

PRINTING ROLLER

BACKGROUND OF THE INVENTION

1. Field of the Invention

The present invention relates to a printing roller used as, for example, an ink distributing roller, an ink form roller, a rider or a fountain roller included in an ink mechanism for a printer, a metering roller replacing an anilox roller, an ink transfer roller, a metering roller or an ink fountain roller included in a keyless inking system, or a fountain roller, a distributing roller, a metering roller or an applicator roller included in a coating machine of a paint or an adhesive, as well as to a method of manufacturing the same.

2. Description of the Related Art

It is widely known to the art to use a rubber roller for the control of an ink amount, and it was customary in the past to apply the particular idea to an ink distributing roller. For example, a rubber roller is used for forming an ink transfer roller included in a keyless inking system constructed not to use a finger grip for controlling the ink amount. The particular ink transfer roller is used mainly in a keyless offset rotary press for the news paper printing.

FIG. 1 schematically shows a conventional keyless offset rotary press. As shown in the drawing, the rotary press includes an ink fountain roller 1 which is rotated at a low speed to draw up an ink. An ink transfer roller 2 serving to transfer the ink supplied from the ink transfer roller 1 is arranged adjacent to the roller 1. It should be noted that the roller 2 also acts as an ink metering roller which constitutes a key point in a keyless printing machine. The ink received by the roller 2 is supplied to a doctor roller 3 which is arranged adjacent to the roller 2. A rider roller 4 serving to make uniform the thickness of the ink layer formed on the doctor roller 3 is arranged adjacent to the doctor roller 3. The ink supplied from the doctor roller 3 is transferred onto a printing paper sheet via form rollers 5 and a printing cylinder 6. Further, a steel blade 7 made of a Swedish steel is in contact under pressure with the doctor roller 3.

In the keyless offset rotary press of the construction described above, the ink is transferred from the fountain roller 1 onto the ink transfer roller 2. The main factors determining the quality of the printing such as the concentration of the printed image and uniformity of the printing are determined in this step. The ink is further transferred from the ink transfer roller 2 onto the doctor roller 3 and, then, the ink layer is made uniform by the rider roller 4. Further, the ink is transferred via the inked rollers 5 onto the plate cylinder 6. It should be noted that the ink, which has not been transferred onto the plate cylinder 6 so as to be left on the inked rollers 5, is scraped off the form rollers 5 by the steel blade 7 which is in contact under pressure with the doctor roller 3. It follows that a predetermined amount of ink is kept supplied onto the plate cylinder 6.

In the conventional keyless offset rotary press, the ink fountain roller 1 is rotated at a low speed to draw up an ink. On the other hand, the ink transfer roller 2 abutting against the roller 1 is rotated at a high speed so as to receive ink from the roller 1. The amount of the ink received by the ink transfer roller 2 is greatly dependent on the coarseness and shape on the surface of the roller 2. It should be noted that the ink transfer roller 2 abuts against the ink fountain roller 1 with a nip width of 5 to 10 mm. In addition, the peripheral speed of the roller 2 is 50 times as much as that of the roller 1. In other words, the ink transfer roller 2 is operated under very severe conditions.

It is certainly possible to control easily the ink amount by increasing the nip pressure. In this case, however, the heat generation is increased because of the high pressure and the large difference in the peripheral speed between the rollers 1 and 2. At the same time, the surface of the ink transfer roller 2 is severely abraded, leading to a marked reduction in the life of the roller 2. On the contrary, if the nip pressure is lowered, it is certainly possible to suppress the heat generation and abrasion of the roller surface. In this case, however, it is difficult to reproduce the pattern of the roller surface satisfactorily. In addition, problems are brought about in terms of misting of ink and uneven ink amount.

It is also important to pay attentions to the shape on the surface of the ink transfer roller. If the projections and recesses forming the surface coarseness of the roller are formed with a small pitch, the ink can be transferred uniformly, making it possible to prevent a nonuniform printing. However, the depth of the recess is decreased and, thus, the amount of the ink which is transferred is diminished, leading to emulsification of the ink and to a short life of the roller. On the contrary, if the projections and recesses are formed with a large pitch, the depth of the recess can be increased, leading to a large amount of the ink which is received. In this case, however, the transferred ink amount is rendered nonuniform. As a matter of fact, the nonuniformity is so large that it is impossible to eliminate the nonuniformity even if the transferred ink is kneaded with an ink distributing roller (called a rider roller), with the result that the thickness of the ink transferred onto a paper sheet or the like is rendered uneven.

In order to achieve a required ink thickness and to prevent emulsification of ink, the projection-recess pitch is set at such a large value as 1 to 2 mm in the conventional roller. Also, the surface coarseness is so large as not to be measured accurately. In other words, the conventional roller is used at the sacrifice of the quality of the solid coverage.

It should also be noted that it is very difficult to ensure the required surface coarseness falling within a desired range by the conventional grinding technique because the surface coarseness on the surface of the conventional roller is very small. In other words, the surface coarseness is rendered uneven in the conventional technique, leading to unevenness in the quality of the printed surface, in the life, in the emulsification of ink, etc. In order to overcome these difficulties, vigorous studies have been made in an attempt to develop a technique of engraving the surface of a rubber roller with a laser cutting technique. Specifically, prepared were three kinds of rollers having the surfaces engraved to form lattice patterns each including a large number of diamond configurations as shown in FIGS. 2A to 2C. In the roller shown in FIG. 2A, each diamond configuration includes two diagonally facing corners each having an angle of 60°. These diamond configurations are of a projection type. In other words, these diamond configurations are separated from each other by a groove. In the roller shown in FIG. 2B, each diamond configuration includes two diagonally facing corners each having an angle of 120°. These diamond configurations are also of a projection type. Further, in the roller shown in FIG. 2C, each diamond configuration includes two diagonally facing corners each having an angle of 90°. These diamond configurations are of a depression type. In other words, the depressions are formed separately from each other, failing to form a continuous groove.

Printing was actually performed by mounting each of these three kinds of rollers in place of the ink transfer roller 2 included in the keyless offset rotary press shown in FIG. 1. It has been found that, in the case of the depression type shown in FIG. 2C, the lattice pattern is reproduced on the printed paper sheet or the like. Also, a severe ink misting has been found to take place. Further, the ink concentration on the printed paper sheet or the like has been found to be low. When it comes to the projection type as shown in FIG. 2A or 2B, reproduction of the lattice pattern has been found to be negligibly small. The ink misting has also been found to be low. It should be noted that, in the projection type, the ink is carried through the continuous groove defining the diamond configurations of the projection type. In other words, the ink fluidity is ensured in the projection type so as to suppress the lattice pattern reproduction and the ink misting as pointed out above. In the case of the depression type, however, the diamond configurations form independent cells. In other words, a continuous groove is not formed in the lattice pattern of depression type shown in FIG. 2C, giving rise to the serious problems pointed out above.

However, it is difficult to control the engraving depth by the laser cutting technique, resulting in failure to form a desired pattern on the roller surface and in failure to prevent the pattern from being reproduced on the printed paper sheet or the like. Further, the laser cutting technique is costly and, thus, is unsuitable for the practical application. On the other hand, an ink transfer roller having the surface treated by the conventional grinding method utilizing a grinder or a cutter certainly belongs to a projection type. In this roller, however, the pattern formed on the surface is parallel with the axis of the roller and is in the shape of a wavy projection pattern, with the result that the roller resembles the separated depression type shown in FIG. 2C in its ink transfer function. To be more specific, the conventional roller prepared by employing the conventional grinding technique, which certainly permits increasing the amount of ink to be transferred, lacks continuity so as to allow the ink to be transferred intermittently, leading to a poor ink fluidity and, thus, to serious problems such as emulsification of ink.

The conventional ink transfer roller also includes a roller having the surface grooved in a direction close to its circumferential direction. However, the conventional roller of this type is incapable of preventing the pattern on the roller surface from being reproduced on the printed paper sheet. It is also impossible for the roller to supply ink in an amount required for the ink transfer roller. If it is intended to suppress reproduction of the surface pattern on the printed paper sheet, it is unavoidable to diminish the pitch of the grooved pattern on the surface of the roller. However, the amount of ink to be transferred is further decreased, if the pitch of the grooved pattern is diminished. It is certainly possible to increase the amount of ink to be transferred, if the groove formed on the roller surface extends in a direction making a large angle with the axis of the roller. In this case, however, the grooved pattern on the roller surface is more likely to be reproduced on the printed paper sheet.

When it comes to a grooved roller for the coating of a paint or an adhesive, grooves are formed on the surface of a roller in a screen ruling of 10 to 30 lines/inch such that these grooves extend in the circumferential direction. A paint or adhesive is stored in these grooves so as to permit forming a coated film of a predetermined thickness. In the case of coating an adhesive, an uneven coating does not take place as a serious problem and, thus, the roller for this purpose differs from the ink transfer roller included in a keyless offset rotary press. However, roller for the coating of an adhesive has a short life because of abrasion of the rubber roll, leading to a high cost. In general, a gravure roller system using an anilox roller is employed for the coating of a film with a paint. In this case, a steel blade is brought into contact under pressure with the roller surface so as to remove an excess paint and, thus, to obtain a coated film of a predetermined thickness. Since a steel blade is brought into contact under pressure with the roller surface, the cost, life, etc. of the anilox roller provide serious problems to be solved in the future.

As described above, a metering capability of a suitable amount of an ink is required for a metering roller included in a keyless offset rotary press. It is also required for the metering roller to be capable of preventing the pattern on the surface of an ink transfer roller from being reproduced on the printed paper sheet, to be capable of achieving a high printing stability (or low in unevenness of the printed paper sheet), and to be capable of reducing the cost. This is also the case with the metering roller included in a coating machine.

SUMMARY OF THE INVENTION

An object of the present invention is to solve simultaneously the above-noted contradictory problems inherent in the conventional technique, i.e., a problem that, if the metering amount is increased, the amount of the ink supply is unavoidably rendered uneven, and another problem that, if it is intended to prevent an uneven ink supply, the amount of the ink supply (or the coating amount of a paint or adhesive) is rendered unduly small.

According to a first embodiment of the present invention, there is provided a printer roller comprising a metal core and a surface layer covering the metal core, characterized in that the surface layer is roughened by forming a plurality of lattice-shaped grooves such that a large number of diamond-shaped configurations are defined by the grooves, each diamond-shaped configuration including two diagonally facing corners each having an angle of 20° to 160°, or by forming a number of parallel grooves each forming an angle of 10° to 80° with the axis of the metal core, so as to form a continuous groove.

According to a second embodiment of the present invention, there is provided a method of manufacturing a printing roller, characterized in that a printing roller body, which is kept rotated, is brought into contact under pressure with a flat end surface of a grinding tool such as a grinding cloth, a grinding paper, a grinding plate, or a grinding stone, so as to impart to the surface of the printing roller body a plurality of lattice-shaped grooves which are formed such that a large number of diamond-shaped configurations are defined by the grooves, each diamond-shaped configuration including two diagonally facing corners each having an angle of 20° to 160°, or a number of parallel grooves each forming an angle of 10° to 80° with the axis of the printing roller body, so as to form a continuous groove.

The technique of the present invention makes it possible to solve simultaneously the contradictory problems inherent in the prior art, i.e., a problem that, if the metering amount is increased, the amount of the ink supply is unavoidably rendered uneven, and another problem that, if it is intended to prevent an uneven ink supply, the amount of the ink supply (or the coating amount of a paint or adhesive) is rendered unduly small.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENT

Figure 2A:
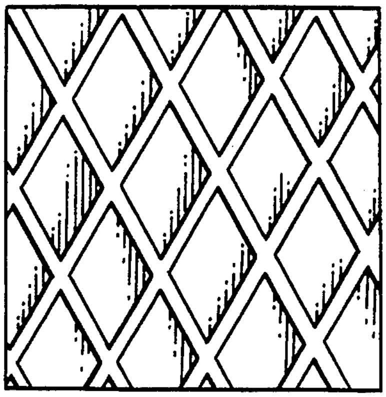
FIGS. 2A to 2C show the surface conditions of the conventional rollers.
Figure 2B:
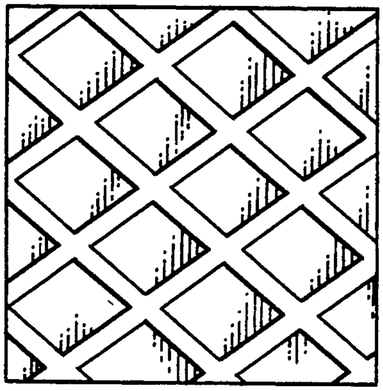
Figure 2C:
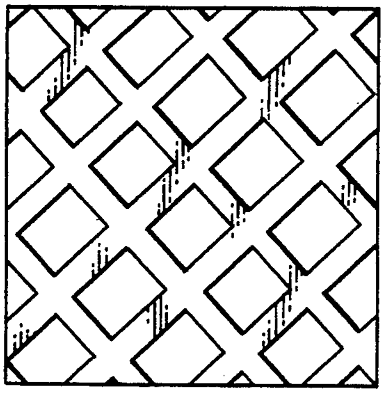
Figure 7:
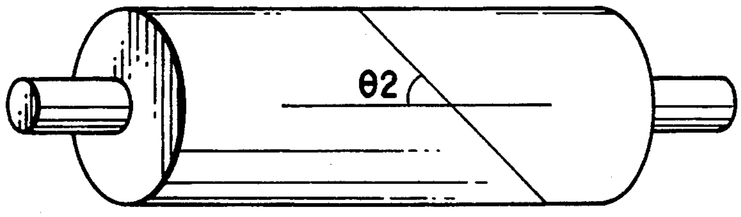
FIG. 7 is an oblique view explaining the angle of a groove formed on the surface of a roller with the axis of the roller.

In order to ensure a smooth fluidity of an ink or a paint, it is important to pay attentions to the shape of the surface of a rubber or resin roller. Specifically, it is important for the grooves determining the surface roughness of the roller to be continuous such that the regions surrounded by the grooves form discontinuous projections. In other words, the surface should be of projection type as shown in FIG. 2A or 2B. It is also important for the grooves on the roller surface to be of a lattice type or of an oblique line type. In other words, the grooves should extend such that a large number of diamond-shaped configurations are defined by the grooves. Alternatively, the grooves should extend in parallel such that each groove makes an angle with the axis of the roller. In order to ensure a smooth fluidity and a sufficient transfer of an ink or a paint, it is also important to pay attentions to the angle $\theta 1$ of each of two diagonally facing corners included in the diamond-shaped configuration and to the angle $\theta 2$ made between each groove and the axis of the roller. Incidentally, the angles $\theta 1$ and $\theta 2$ noted above are shown in FIGS. 5A and 7, respectively. In general, the fluidity is promoted if each of the angles noted above is diminished, and the transfer rate can be increased if the particular angle is enlarged, though the angle should be determined actually by paying attentions to the viscosity and other properties of the ink or paint as well as to the required thickness of the coating layer. In the present invention, lattice type grooves are formed on the surface layer of the roller such that each of the diamond-shaped configurations defined by the grooves includes two diagonally facing corners each having an angle $\theta 1$ of 20° to 160°. Alternatively, oblique grooves are formed in parallel on the surface layer of the roller such that each oblique groove makes an angle $\theta 2$ of 10° to 80° with axis of the roller. Preferably, the angle $\theta 1$ noted above should be about 60°. Also, the angle $\theta 2$ should desirably be about 45°. These values of the angle are determined in the present invention in order to obtain in good balance both a satisfactory fluidity and transfer rate of an ink or a paint.

In the present invention, it is desirable for the surface layer of the roller to have a surface roughness of 10 $\mu$m to 200 $\mu$m in terms of the 10 point average roughness $R_z$.

In order to improve the uniformity of the ink or paint on a printed paper sheet, the pitch of the grooves should be as small as possible. On the other hand, the pitch should be enlarged in order to increase the transfer rate of the ink or paint. In the conventional grinding method, it is impossible to enable a roller to have a surface condition meeting these requirements simultaneously. In the conventional method of grinding the surface layer of a rubber or resin roller, it is popular to allow a rotating grinding stone to abut under pressure against the surface layer of the roller which is kept rotated. It is also popular to use a grinding tool called a grinding stone or a cutter of a special shape having a discontinuous circumferential surface. It is proposed to allow the special grinding tool to abut against the surface of the roller such that the abutting surface of the grinding tool makes an angle with the roller axis. In this technique, however, it is impossible to form lattice type grooves on the surface layer of the roller, and the grooves formed on the surface layer tend to form a regular pattern.

Figure 3A:
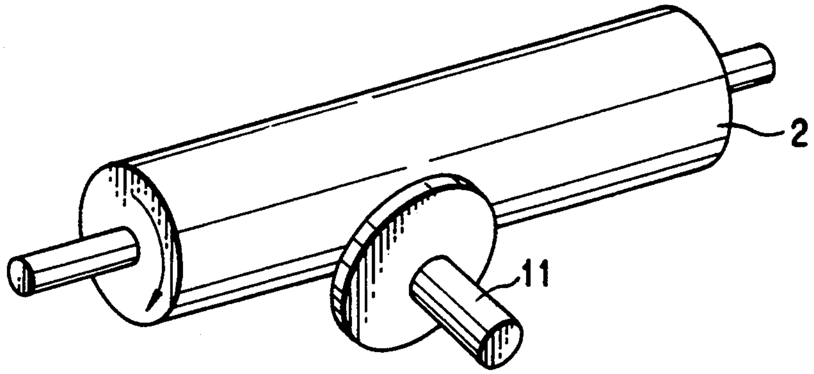
FIG. 3A is an oblique view.
Figure 3B:
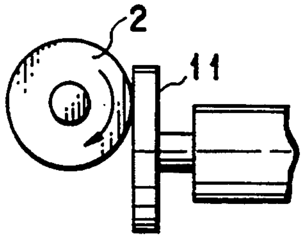
FIG. 3B is a plan view of the system shown in FIG. 3A.

The present invention has been achieved in view of the situation described above. It should be noted that a cylindrical mirror grinding system is employed as a grinding method for finishing the surface of a metal or resin roller as a mirror-like surface. The particular grinding system is applied in the method of the present invention. To be more specific, in the method of the present invention, the surface layer of a rubber or resin roller is coarsened in the present invention to have an optional coarseness determined by lattice type grooves or oblique grooves extending in parallel. It is important to note that, in the method of the present invention, the surface layer 2 of a rubber or resin roller, which is kept rotated, is brought into contact under pressure with a flat end surface, not a circumferential surface, of a grinding tool such as a grinding cloth, a grinding paper, a grinding plate, or a grinding stone so as to impart a desired grooves to the surface layer of the roller, as shown in FIGS. 3A and 3B. Incidentally, FIG. 3A is an oblique view and FIG. 3B is a front view of FIG. 3A. A reference numeral 11 shown in these drawings represents a grinding tool.

The materials used in the present invention for forming the surface layer of the ink transfer roll include, for example, nitrile rubber urethane rubber, epichlorohydrin rubber, fluororubber, silicone rubber, ethylene-propylene copolymer rubber, acrylic rubber, butyl rubber, epoxy resin, urethane resin, polyamide resin, vinyl chloride resin, polyethylene resin, polyester resin, and phenolic resin.

In the method of the present invention, it is possible to use various kinds of grinding tools, compared with the conventional grinding method in which a circumferential surface of a grindstone is used for the grinding treatment. Since various kinds of grinding tools can be used in the present invention, it is possible to determine as desired the shape and depth of the pattern formed on the surface layer of the roller. In addition, the pattern can be formed and controlled stably. For example, the angle made between the groove formed on the surface layer of the roller and axis of the roller can be controlled by controlling the relationship between the rotating speed of the roller and the feeding speed of the grinding tool. Also, the pattern formed on the surface layer of the roller can be made irregular by making the shape on the surface of the grinding tool irregular. What should be noted is that the pattern on the surface layer of the roller can be prevented from being reproduced on the printed paper sheet, if the pattern noted above is made irregular. In the present invention, a satisfactory fluidity and transfer amount of an ink can be ensured by forming grooves in the surface layer of the roller such that these grooves are inclined from the axis of the roller. The particular technique of the present invention makes it possible to diminish sufficiently the pitch of the patterns formed in the surface layer of the roller. This makes the present invention more advantageous in terms of the capability of preventing the pattern from being reproduced on the printed paper sheet.

(Comparative Example 1)

Figure 1:
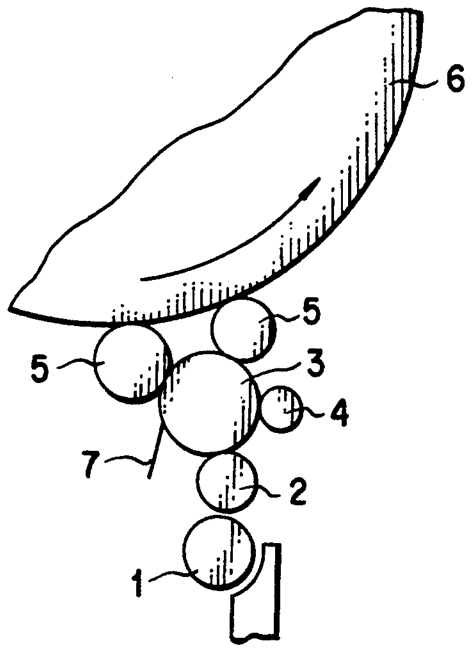
FIG. 1 schematically shows a conventional keyless offset rotary press.

A conventional roller having a 10 point average surface roughness $R_z$ of 50 $\mu$m was prepared by the conventional method using a grindstone. The roller, which was made of a nitrile rubber, i.e., nitrile butadiene rubber, having a hardness of 25° (Shore A type), was used as an ink transfer roller included in the known keyless offset rotary press for the news paper printing shown in FIG. 1. The ink transfer amount was found to be insufficient such that the ink density was only 0.8. Also, the ink was found to have been emulsified, giving rise to a roller stripping phenomenon, i.e., the phenomenon that ink was not transferred, making it necessary to renew the ink. Further, the average roughness $R_z$ was lowered to 38 $\mu$m one month later because of abrasion, making it impossible to continue to use the roller.

(Comparative Example 2)

A roller made of a nitrile rubber having a hardness of 40° was prepared by the conventional method. In this case, a wavy pattern having a pitch of about 1 mm was formed on the surface layer of the roller by using a special cutter which was discontinuous on the circumferential surface. The roller thus prepared was used as an ink transfer roller included in the known keyless offset rotary press for the news paper printing shown in FIG. 1. The ink supply amount was found to be sufficient so as to achieve an ink density of 1.1. Also, the life of the roller was found to be as much as about 8 months. However, the wavy pattern on the surface of the roller was reproduced on the solid print portion and at least 40% of the half tone. Further, emulsification of the ink occasionally took place in the case where printed paper sheet included a large solid print portion.

(EXAMPLE 1)

A roller having a diameter of 150 mm was prepared by using a nitrile rubber having a hardness of 35° for use as an ink transfer roller included in the known keyless offset rotary press. The roller thus prepared was mounted to a polishing machine and rotated at a speed of 100 rpm. Under this condition, a circular grind paper having a diameter of 125 mm and having diamond abrasive grains mounted thereto was allowed to traverse at a feeding rate of 700 mm/min. In this step, the grind paper was rotated at a speed of 750 rpm and brought into contact under pressure with the roller surface so as to form grooves of a predetermined pattern in the surface region of the roller.

The grooves formed on the roller surface were found to define a large number of diamond configurations each including two diagonally facing corners each having an angle of about 100°. Of course, these grooves were found to communicate with each other, and to have a 10 point average roughness $R_z$ of 94 to 116 $\mu$m and a maximum roughness $R_{max}$ of 115 to 172 $\mu$m.

The roller thus prepared was actually mounted to a keyless offset rotary press with a nip width with the fountain roller set at 5 mm. The grooved pattern on the roller surface was not reproduced on the printed paper sheet. Also, the ink density on the printed paper sheet was found to be sufficiently high, i.e., 1.15. Further, emulsification of the ink was not recognized at all, leading to such a long life of the roller as 14 months.

(Example 2)

Figure 4:
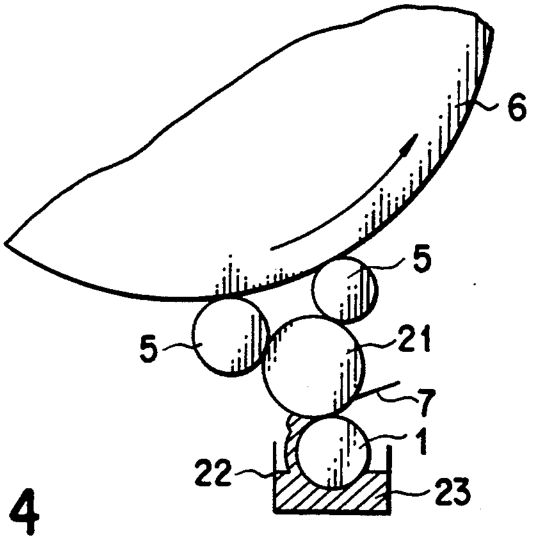
FIG. 4 schematically shows a conventional keyless rotary press.

FIG. 4 shows a known keyless offset rotary press. In a rotary press of this type, a difficulty is brought about in the case where the ink composition used has a high viscosity or has a water content exceeding 30%. Specifically, where the printing speed exceeds 100,000 sheets/hour, the ink fails to be drawn up to the metering roller. To overcome the difficulty, the conventional fountain roller is formed of nitrile rubber (acrylonitrile-butadiene rubber) having a hardness of 60° and has an average surface roughness $R_z$ of about 8 to 12 $\mu$m. However, the grinding method of the present invention was applied in this Example to the surface of the conventional roller.

Figure 5A:
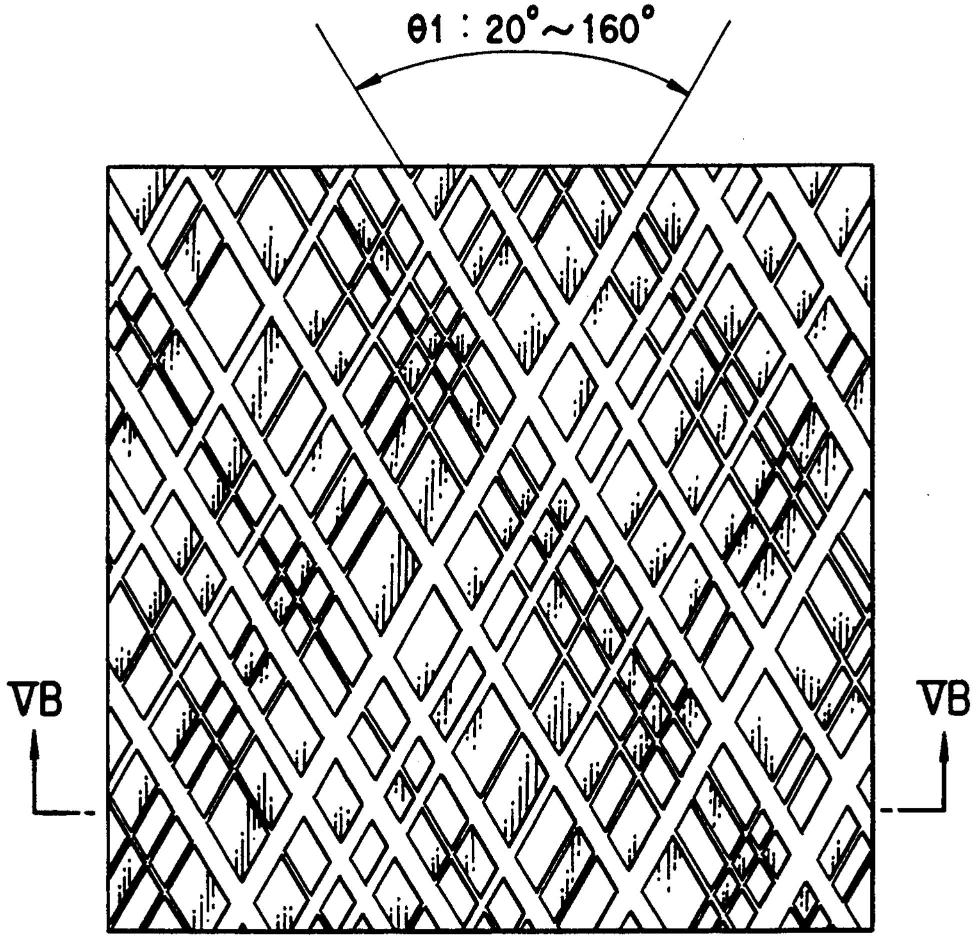
FIGS. 5A and 5B collectively show the shape of a random lattice formed in the present invention.
Figure 5B:
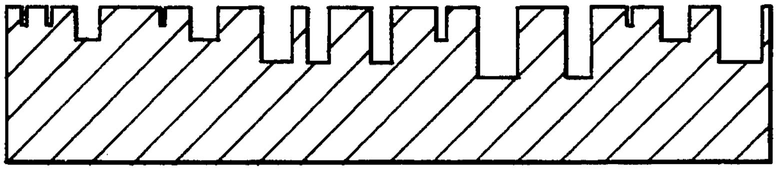

The roller thus prepared was mounted to a polishing machine and rotated at a speed of 100 rpm. Under this condition, a circular grind paper having a diameter of 125 mm and having diamond abrasive grains of 32 meshes mounted thereto was allowed to traverse at a feeding rate of 700 mm/min. In this step, the grind paper was rotated at a speed of 750 rpm and brought into contact under pressure with the roller surface so as to form grooves of a predetermined pattern in the surface region of the roller, with the result that the roller surface exhibited an average surface roughness $R_z$ of 74 to 113 $\mu$m and a maximum surface roughness $R_{max}$ of 88 to 142 $\mu$m. The grooved surface of the roller was in the form of a lattice shaped at random as shown in FIGS. 5A and 5B. The black stripes shown in FIG. 5A denote the grooves. FIG. 5B shows a cross section of FIG. 5A.

The rubber roller thus prepared was mounted to the known keyless offset rotary press shown in FIG. 4 in place of the roller 21, with the result that it was possible to achieve printing with a printing speed of 120,000 sheets/hour in a color printing using an ink having a viscosity of 23 to 32 poises. Also, a roller stripping phenomenon did not take place. The roller stripping phenomenon did not take place even in the case of using an emulsion ink having a viscosity of 13 to 23 poises. Also, the misting problem was found to be much smaller than in the case of using a conventional fountain roller. Incidentally, a reference numeral 21 in FIG. 4 represents an ink metering roller made of a resin. It is seen that an ink 23 is housed in an ink pan 22.

(EXAMPLE 3)

Figure 6:
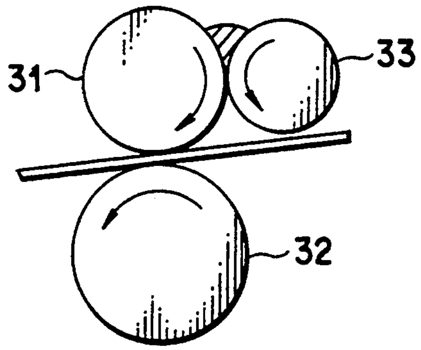
FIG. 6 schematically shows a coating roller for a plywood.

FIG. 6 shows a coating roller applied to plywood. In the conventional roller of this type, a spiral groove is formed on the surface such that the turns of the spiral extend in the circumferential direction of the roller. The device shown in FIG. 6 comprises a coating roller 31, a chromium back roller 32 and a chromium metering roller 33. The coating roller 31 is formed of a nitrile rubber having a hardness of 25° to 45°. In general, grooves each having a depth of 300 to 500 μm are formed on the surface of the coating roller at screen ruling of 18 to 24 lines/inch. In the conventional coating roller, however, the grooves simply extend in parallel in the rotating direction of the roller, with the result that the fluidity of an adhesive is rendered too high to draw up the adhesive in a desired amount. Naturally, the performance of the roller is greatly affected by a change in properties caused by abrasion of the roller. Also, the life of the roller is short. For example, the roller exhibits a life of about 2 months when the roller is moved at a speed of about 70 mm/min.

On the other hand, a roller made of a nitrile rubber having a hardness of 45° and having a diameter of 300 mm was rotated at 50 rpm. On the other hand, a sand paper having diamond particles of 18 meshes mounted thereto and having a diameter of 125 mm was rotated at 750 rpm and moved to bite the rubber roller surface at a speed of 200 mm/min so as to apply a grinding treatment to the rubber roller surface. As a result, the roller surface was imparted with a lattice pattern of grooves and was found to have an average surface roughness $R_Z$ of 136 to 160 μm. The roller thus prepared was used as the coating roller 31 shown in FIG. 6 for coating a plywood with an adhesive. The entire surface of the plywood was found to have been coated uniformly with the adhesive, though the adhesive coating forms a striped pattern in the case of using the conventional coating roller. Further, the life of the coating roller prepared by the method of the present invention was found to be prolonged to reach 6 months.

In the Examples described above, the surface layer of the roller was formed of a nitrile rubber. Needless to say, however, it is possible to use other materials for forming the surface layer of the roller. For example, it is also possible to use rubbers such as an urethane rubber, an epichlorohydrin rubber, a fluororubber, a silicone rubber, an ethylene-propylene copolymer rubber, an acrylic rubber and a butyl rubber, and resins such as an epoxy resin, an urethane resin, a polyamide resin, a vinyl chloride resin, a polyethylene resin, a polyester resin and a phenolic resin.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A printing roller comprising a metal core and a surface layer covering the metal core, wherein the surface layer is roughened by forming a plurality of lattice-shaped grooves such that a large number of diamond-shaped configurations are defined by the grooves, each diamond-shaped configuration including two diagonally facing corners each having an angle of 20° to 160°, or by forming a number of parallel grooves each forming an angle of 10° to 80° with the axis of the core, so as to form a continuous groove, said grooves having irregular widths and depths, and said surface layer having a 10 point average surface roughness $R_Z$ of 10 to 200 μm.

2. The printing roller according to claim 1, wherein said surface layer of the printing roller is formed of a material selected from the group consisting of a nitrile rubber, an urethane rubber, an epichlorohydrin rubber, a fluororubber, a silicone rubber, an ethylene-propylene copolymer rubber, an acrylic rubber and a butyl rubber, an epoxy resin, an urethane resin, a polyamide resin, a vinyl chloride resin, a polyethylene resin, a polyester resin and a phenolic resin.

* * * * *